(12) United States Patent
Berling (10) Patent No.: US 11,976,823 B2
(45) Date of Patent: May 7, 2024

(54) HOB ASSEMBLY HAVING A CONNECTING ELEMENT

(71) Applicant: Inovvida Aero IP UG (haftungsbeschrankt), Ibbenburen (DE)

(72) Inventor: Udo Berling, Hopsten (DE)

(73) Assignee: Caso Holding GmbH, Arnsberg (DE)

( * ) Notice: Subject to any disclaimer, the term of this patent is extended or adjusted under 35 U.S.C. 154(b) by 751 days.

(21) Appl. No.: 17/052,725

(22) PCT Filed: May 3, 2019

(86) PCT No.: PCT/EP2019/061327
§ 371 (c)(1),
(2) Date: Nov. 3, 2020

(87) PCT Pub. No.: WO2019/211417
PCT Pub. Date: Nov. 7, 2019

(65) Prior Publication Data
US 2021/0231313 A1   Jul. 29, 2021

(30) Foreign Application Priority Data

May 4, 2018   (DE) .......................... 102018110780.3

(51) Int. Cl.
*F24C 15/20*   (2006.01)
*A47B 77/08*   (2006.01)
(Continued)

(52) U.S. Cl.
CPC .......... *F24C 15/2042* (2013.01); *A47B 77/08* (2013.01); *B01D 46/0038* (2013.01); *B01D 46/4227* (2013.01); *B01D 2279/35* (2013.01)

(58) Field of Classification Search
CPC ............ B01D 46/0038; B01D 46/4227; B01D 2279/35; F24C 15/2042; F24C 15/2085; A47B 77/08
See application file for complete search history.

(56) References Cited

U.S. PATENT DOCUMENTS 2,674,991 A   4/1954   Schaefer
4,446,849 A   5/1984   McFarland
(Continued)

FOREIGN PATENT DOCUMENTS

AU   2014259588 B2   3/2017
DE   8709345 U1   9/1987
(Continued)

OTHER PUBLICATIONS

International Search Report dated Nov. 4, 2019; International Application PCT/EP2019/061327.

*Primary Examiner* — Alfred Basichas
(74) *Attorney, Agent, or Firm* — Dinsmore & Shohl LLP (57) ABSTRACT

In order to solve the problem of providing an improved hob assembly which can be integrated into kitchen furniture of any type in a particularly easy manner, a hob assembly is proposed which includes at least one cooking zone, at least one air-purifier device arranged beneath the cooking zone, and at least one connecting element for connecting the cooking zone to the air-purifier device such that air can be conducted from the cooking zone to the air-purifier device via the connecting element, wherein the connecting element is arranged on the cooking zone in a mechanically removable manner and is height-adjustably mounted in the air-purifying device.

11 Claims, 8 Drawing Sheets

(51) Int. Cl.
  *B01D 46/00*   (2022.01)
  *B01D 46/42*   (2006.01)

(56) References Cited

U.S. PATENT DOCUMENTS

2018/0073745 A1    3/2018  Norman et al.
2020/0278118 A1*   9/2020  Berling .................. B01D 50/20

FOREIGN PATENT DOCUMENTS

| DE | 202013005303 U1 | 6/2013 |
| DE | 102016207087 A1 | 10/2017 |
| JP | S6030916 A | 2/1985 |
| WO | 2018050719 A1 | 3/2018 |

* cited by examiner

HOB ASSEMBLY HAVING A CONNECTING ELEMENT

CROSS-REFERENCE TO RELATED APPLICATIONS

This application is the U.S. national stage of PCT/EP2019/061327 filed May 3, 2019, which claims priority of German patent application 102018110780.3 filed May 4, 2018, both of which are hereby incorporated by reference in their entirety.

FIELD OF THE INVENTION

The present disclosure relates to a hob assembly with at least one cooking zone, at least one air-purifier device arranged beneath the cooking zone and at least one connecting element for connecting the cooking zone to the air-purifier device such that air can be conducted from the cooking zone to the air-purifier device via the connecting element. The present disclosure also relates to a connection assembly for a hob assembly and a connecting element for a connection assembly.

BACKGROUND OF THE INVENTION

Kitchen islands are becoming increasingly popular and thus so are air-purifier devices arranged beneath the cooking zone as an alternative to exhaust hoods. The air-purifier device is arranged beneath the cooking zone, usually in a drawer of the respective kitchen furniture in which the cooking zone is enclosed. The distance between the cooking zone and air-purifier device, which varies depending on the kitchen furniture, is mostly bridged by individually adapted components in order to move the air-purifier device as close as possible to the cooking zone. A ventilation tube is inserted into the air-purifier device from the cooking zone. The installation of such hob assemblies is complex.

SUMMARY OF THE INVENTION

It is the object of the present invention to provide an improved hob assembly which can be installed in kitchen furniture of any type in a particularly easy manner.

The object is achieved by a hob assembly as well as by a connection assembly for a hob assembly and by a connecting element for a connection assembly as described below.

The hob assembly includes at least one cooking zone, at least one air-purifier device arranged beneath the cooking zone and at least one connecting element for connecting the cooking zone to the air-purifier device such that air can be conducted from the cooking zone to the air-purifier device via the connecting element, the connecting element being arranged on the cooking zone in a mechanically removable manner and height-adjustably mounted in the air-purifier device. The hob assembly may be installed not just in cooking islands but in a wide variety of kitchen furniture with different dimensions since the varying distance between the cooking zone and the air-purifier device, which can result from different drawer depths, is compensated for by the height-adjustable mounting of the connecting element in the air-purifier device.

The connecting element is arranged beneath the cooking zone and is therefore not visible from the outside. The connecting element is may be arranged in a suction opening of the air-purifier device, via an adapter. The connecting element protrudes at least partially into a housing of the air-purifier device, such that the connecting element is adjacent to a fan wheel arranged in the housing of the air-purifier device. This protrusion takes place both in an assembly position and in an installation position in which a connection to the cooking zone has been established by the connecting element. The connecting element is accommodated in the housing of the air-purifier device in a sliding height-adjustable manner. In the assembly position, the connecting element is initially received in the housing via a preferably maximum displacement path, the displacement path possibly being limited by stops or the like on the connecting element and/or in the housing. In the assembly position, the connecting element is arranged in the air-purifier device such that it is freely displaceable; a mechanically removable assembly beneath the cooking zone only takes place in the assembly position. Then, the air-purifier device is placed beneath the cooking zone. Subsequently, in order to achieve the installation position, the connecting element is moved from above the cooking zone to an underside of the cooking zone and mounted there in a mechanically removable manner, for example in a connecting piece arranged beneath the cooking zone. By arranging the connecting element in the air-purifier device at least partially in the housing, in the suction opening, a compact assembly is provided which can be arranged on cooking zones of varying dimensions in a simple and visually pleasing manner. This is achieved by at least partially integrating the displacement path of the connecting element in the air-purifier device, or, to be more exact, in its housing.

The mechanically removable arrangement of the connecting element means that it can be mounted and removed in a particularly easy and fast manner. After having removed the connecting element, the cooking zone and the air-purifier device are decoupled from one another. The air-purifier device can then be taken, for example, from a drawer of the kitchen furniture in which the air-purifier device is arranged. The hob assembly furthermore makes it possible to service the air-purifier device in a particularly easy and fast manner.

The cooking zone has at least one cooking surface. The cooking surface is arranged on an upper side of the cooking zone. The cooking surface can be a ceramic or induction cooking surface. The cooking surface is enclosed in kitchen furniture in the countertop of a kitchen cabinet.

The connecting element can be arranged on the cooking zone either directly or indirectly. In the case of an indirect arrangement, the connecting element can be arranged, for example, adjacent to the cooking zone in the kitchen furniture or on the countertop of the kitchen furniture.

The connecting element is arranged in a through opening on the cooking zone. In the case of a plurality of openings, the through opening can alternatively or cumulatively be arranged adjacent to the cooking zone in the kitchen furniture or the countertop of the kitchen furniture close to the cooking zone.

The cooking zone has at least one central, through opening, the connecting element being arranged in the through opening in a mechanically removable manner. This way, the connecting element, which may be in a central position on a cooking zone with four cooking hobs, can remove air particularly effectively. Furthermore, additional adaptations of the kitchen furniture in which the cooking zone or the hob assembly is enclosed are avoided so that the hob assembly according to the invention can be installed particularly quickly and easily.

The connecting element can be passed completely through the through opening. This way, the connecting element can be removed from the through opening for dismantling purposes. To mount the assembly, the connecting element can be reinserted through the through opening.

The connecting element includes at least one grip element for pulling the connecting element out of the air-purifier device or the through opening. This makes it possible for the user to remove the connecting element without tools. The user can hold the connecting element on the handle element and pull it out. It is also conceivable that the connecting element can be rotated by the user by means of the grip element in order to release a mechanically removable fastening such as a rotary or bayonet lock. The connecting element and the air-purifier device can therefore be cleaned easily so as to improve cleanliness.

The grip element includes at least one web and. At least four webs are arranged in a cross shape to one another in order to form a robust handle. The webs are arranged at right angles to one another. To increase stability, the web or the webs may be double webs, which are further arranged at a right angle to one another.

The grip element may be an advertising surface, as a falling protection or to reduce suction noise. The grip element can have a flat central plate where the webs of the grip element intersect. The middle surface can serve as an advertising surface.

The hob assembly can have at least one fastening type for the mechanically removable arrangement of the connecting element on the cooking zone. The fastening type may be at least one latching lock. The hob assembly can have at least a groove, a tongue, a latching projection and a cutout. The fastening type may be a connecting piece. The fastening type can also include a twist lock or bayonet lock. The hob assembly includes for example at least one thread. It is also conceivable that the fastening type includes a magnet.

The connecting element includes at least one groove for a mechanically removable assembly on the cooking zone. The groove may be a circumferential annular groove.

The connecting element may have an elongated hollow body with at least two openings. The connecting element may be tubular in shape. The connecting element has two end faces, namely an upper and a lower face, and at least one lateral surface connecting them. At least one opening is formed on the end faces. The connecting element has at least one round cross section. The cross section can be oval in shape. In other embodiments, an angular cross sections are likewise possible. The connecting element can, for example, have a square or honeycomb cross section. The connecting element can have a plurality of different cross sections. The cross sections can have at least one comparatively narrowed cross section to form stops, contact surfaces or grooves. The connecting element may be made of plastic. The connecting element can also be made of metal.

The connecting element has a first end portion, which is the front end portion in an insertion direction of the connecting element, the upper end face of which is assigned to said end portion and adjoins the surface of the cooking zone, which is arranged in the through-opening in a mechanically removable manner. A previously described fastening type, a connecting piece, is arranged or designed on the first end portion. The above-described groove is arranged in the first end portion.

The connecting element may have a second end portion which is at the rear in the insertion direction of the connecting element and which is height-adjustably mounted in the air-purifier device. The lower end face is assigned to the second end portion.

The hob assembly includes at least one attachment element for the connecting element. The attachment element has at least partially the same cross section as the connecting element. The attachment element may be made of plastic. The attachment element is designed as an elongated hollow body and has two end faces and a lateral surface connecting them. A lower end face is designed for arrangement on the connecting element. The attachment element is tubular or cylindrical in shape. The attachment element has a lower opening which is formed on the lower end face. The attachment element has a further, upper opening which is formed on an upper end face. It is also possible to provide at least one opening in the lateral surface of the attachment element, in which case the further, upper opening can either be omitted or be present. By means of the attachment element, air can be drawn in beneath the cooking zone at a distance, for example to take into account the height of pots.

The connecting element can have at least one radial stop for a tubular attachment element. The stop is designed as a radially circumferential recess. The connecting element can have at least one radial contact surface for attaching a tubular attachment element.

In order to achieve turbulences in the air for purifying the air, the hob assembly can have at least one air conducting element or a swirl generator, on the attachment element and/or on the connecting element. The at least one air conducting element can be formed on an inner wall of the attachment element and/or an inner wall of the connecting element. The air conducting element can be formed in the region of an opening in the attachment element and/or the connecting element. The air conducting element can, for example, be formed on the grip element described above.

The cooking zone includes at least one connecting piece as a fastening type, which is arranged beneath a surface of the cooking zone. The connecting element can be arranged in the connecting piece in a mechanically removable manner. The connecting element is designed so that it can be completely passed through the connecting piece in order to make it easy and quick to remove.

The connecting piece can be designed as a tube receptacle. The connecting piece can have at least one receiving opening for the connecting element. The inner diameter of the receiving opening and the outer diameter of an outer surface of the connecting element can be designed substantially the same so that the connecting element can, at least partially, be arranged in the receiving opening in a form-fitting manner. Likewise, the receiving opening can be designed to be congruent with the through opening of the cooking zone.

The connecting piece can include at least one fastening type as described above. The connecting piece has at least one latching projection. The latching projection is arranged on the inside or inside the receiving opening. The connecting piece has at least four latching projections. The connecting piece is designed as a separate component. The cooking zone can have an integrated connecting piece or a receptacle for the same. The connecting piece can also be designed as a support for a switch.

The connecting piece has a flange so that it can be attached to an underside of the cooking zone or the cooking surface. The flange can have ribbing in order to allow for a strong adhesive connection. To enlarge the surface, the flange can have at least one laterally protruding wing. The flange has two wings that are opposite one another. At least one reinforcement rib, such as three reinforcement ribs, can be formed on the underside of the wing. A support for a switch can be formed, or a switch can be arranged on the underside of the wing.

The connecting piece has a tubular connecting part. This part extends downward away from the flange and surrounds the receiving opening of the connecting piece. The connecting part has at least one notch portion at which the connecting part is elastic. At least one latching projection is formed on the inside of the notch portions.

The connecting element is height-adjustably mounted in a suction opening of a housing of the air-purifier device. The air-purifier device can, for example, include at least one adapter, with the connecting element being mounted in the adapter such that it can be height-adjustably mounted. The adapter is designed in the form of a sleeve, with the connecting element being at least partially received in the adapter. The adapter completely encloses the connecting element.

For easy insertion of the connecting element, the adapter has an inner contact wall that tapers conically. The adapter has a stop for a lower end face of the connecting element or the second end portion. The stop is designed as a radially circumferential projection on the inner contact wall. The adapter has a flange on the upper side, which extends radially away from the adapter. The flange can include a support for a switch.

The hob assembly includes at least one switch which is in operative connection with the connecting element and/or the air-purifier device. For the safety of the user, the power supply to the hob assembly or to the cooking zone and/or to the air-purifier device is interrupted by the switch when the connecting element and/or the air-purifier device are removed. The switch includes at least one button. The button touches an outer surface of the connecting element and/or an outer surface of the air-purifier device, in r the housing of the air-purifier device. When the connecting element and/or the air-purifier device are removed, the switch is activated by the button. Alternatively, instead of a mechanical button, the switch can have at least one sensor, for example an infrared sensor, which signals the removal or the presence of the connecting element or the air-purifier device. The switch can be arranged on the connecting piece, the adapter or on the air-purifier device.

According to an embodiment, the hob assembly includes a connecting element which is designed in the shape of a round tube and which has a circumferential lateral surface or an outer surface. The connecting element has a radially circumferential groove which is formed on an outer surface. The groove is designed to receive latching projections. This groove divides the connecting element into a first end portion and a second end portion. In the first end portion, in the region of an inlet opening, the outer surface includes a recess which forms an axial stop and a radial contact surface for an attachment element. The connecting element has an outlet opening opposite the inlet opening. The inlet opening and the outlet opening are arranged on the front end on the connecting element. The connecting element has a grip element with four double webs which intersect in a central plate in front of the inlet opening. The double webs are arranged at right angles to one another. To pull out the connecting element, the user inserts fingers between the double webs and grips the middle plate. Then, the user pulls the connecting element upwards. The connecting element is fastened to a cooking zone with a central through opening through a connecting piece in a mechanically removable manner. The connecting piece is designed as a tube receptacle. The connecting piece has a receiving opening in which the connecting element is arranged. The receiving opening is congruent with the through opening of the cooking zone.

In an embodiment, the connecting piece has four latching projections. The connecting piece has a flange on which the connecting piece is fastened to an underside of the cooking zone. The flange has ribs. The flange also has two wings that face each other. At least one reinforcement rib is formed on the underside of the wings. The connecting piece has a tubular connecting part. This part extends downward away from the flange and surrounds the receiving opening. The connecting part has four notch portions, with a latching projection being formed on the inside of the notch portions. The locking projections engage in the circumferential groove of the connecting element. The second end portion of the connecting element is height-adjustably mounted in the suction opening of an air-purifier device by an adapter. The adapter is tubular and has an inner contact wall for the second end portion of the connecting element, which tapers conically. The adapter has a radially circumferential projection as a stop, which is formed on the inner contact wall. The amount of displacement of the connecting element is determined by the longitudinal extension of the inner contact wall. A flange with a support on which a switch is arranged is formed on top of the adapter. The flange rests on an outer surface of the air-purifier device. The switch is in operative connection with the outer surface of the connecting element via a mechanical button. When the connecting element is pulled out of the adapter, the power supply to the hob assembly is interrupted.

The connection assembly for a hob assembly includes at least one connecting element, at least one connecting piece and at least one adapter with the connecting element being arranged in the connecting piece so as to be mechanically removable and height-adjustably mounted in the adapter. The connecting element, the connecting piece and/or the adapter of the connection assembly according to the invention can be designed as described with reference to the hob assembly. The connecting element can be completely passed through the connecting piece.

The connecting element has at least one grip element for a user to be able to pull the connecting element out. The grip element can be designed as described above in relation to the hob assembly.

The connection assembly has at least one switch with at least one operative connection to an outer surface of the connecting element. The switch can be designed and arranged as described above in relation to the hob assembly The connecting piece and/or the adapter can have a through opening for receiving the connecting element. The through opening is designed at least partially to correspond to a lateral surface or an outer surface of the connecting element. The connecting element is tubular in shape. The connecting piece and/or the adapter are at least partially annular in order to at least partially enclose the connecting element. The through opening of the connecting piece and/or the adapter can have a circular, oval or rectangular contour. Other polygonal, contours are conceivable as well.

An embodiment of the connection assembly is formed from the hob assembly described above but without a cooking zone and air-purifier device.

The connecting element for a connecting assembly has at least one grip element for a user to be able to pull out the connecting element. The connecting element can be designed as described in relation to the hob assembly and the connection assembly according to the invention. The connecting element is tubular in shape. The connecting element has at least one radial stop for a tubular attachment element. The connecting element has at least one radial contact surface for attaching a tubular attachment element.

The connecting element includes at least one groove for a mechanically removable latching connection. According to an embodiment, the connecting element is designed in the shape of a round tube and has a circumferential lateral surface or outer surface. The connecting element has a radially circumferential groove which is formed on an outer surface. The groove is designed to receive latching projections. This groove divides the connecting element into a first end portion and a second end portion. In the first end portion, in the region of an inlet opening, the outer surface includes a recess which forms an axial stop and a radial contact surface for an attachment element. The connecting element has an outlet opening opposite the inlet opening. The inlet opening and the outlet opening are arranged on the front end on the connecting element. The connecting element has a grip element with four double webs which intersect in the central plate in front of the inlet opening. The double webs are arranged at right angles to one another. To pull out the connecting element, the user inserts fingers between the double webs and grips the middle plate. Then, the user pulls the connecting element upwards.

BRIEF DESCRIPTION OF THE DRAWINGS

These and other advantages of the present disclosure are explained in more detail with reference to the following figures. The figures show the following.

It should be stated at this point that the embodiments of the invention shown in the figures are not to be interpreted restrictively. Rather, the features described there can be combined with one another or with the previously described features in the description to form further configurations.

DETAILED DESCRIPTION OF THE DRAWINGS

Figure 1:
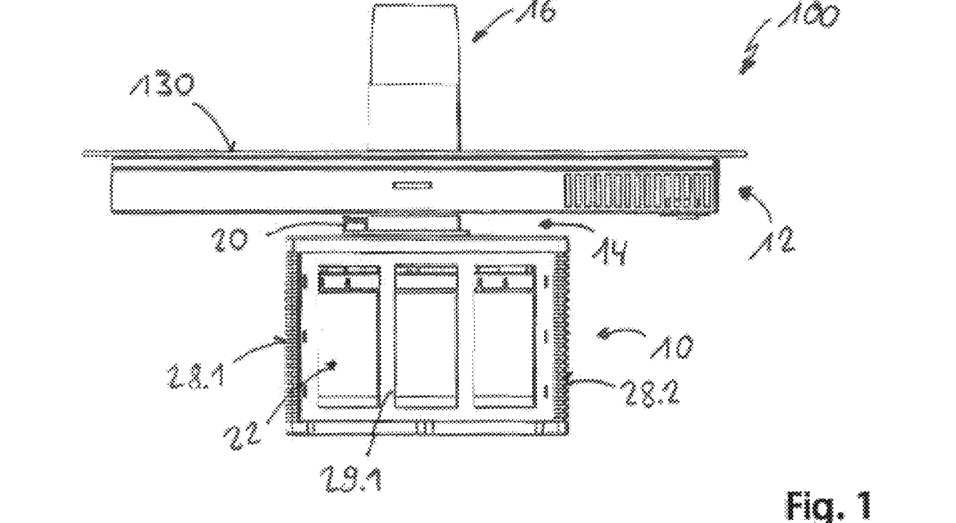
FIG. 1 schematically depicts a side view of a hob assembly according to one or more embodiments shown and described herein.

FIG. 1 shows a view of a hob assembly 100 from a transverse side part 29.1. The hob assembly 100 includes a cooking zone 12 with an attachment element 16 and with an air-purifier device 10 which is arranged beneath the cooking zone 12 and is connected to the cooking zone 12 via a connecting element 14. The air-purifier device 10 has a housing 22 which, in addition to the transverse side part 29.1, shows the longitudinal side parts 28.1 and 28.2. The further transverse side part opposite the transverse side part 29.1 is not shown. Finally, FIG. 1 also shows a possible assembly of a switch 20 which, for example, interacts with the connecting element 14 or with an upper side of the housing 22 of the air-purifier device 10.

Figure 2:
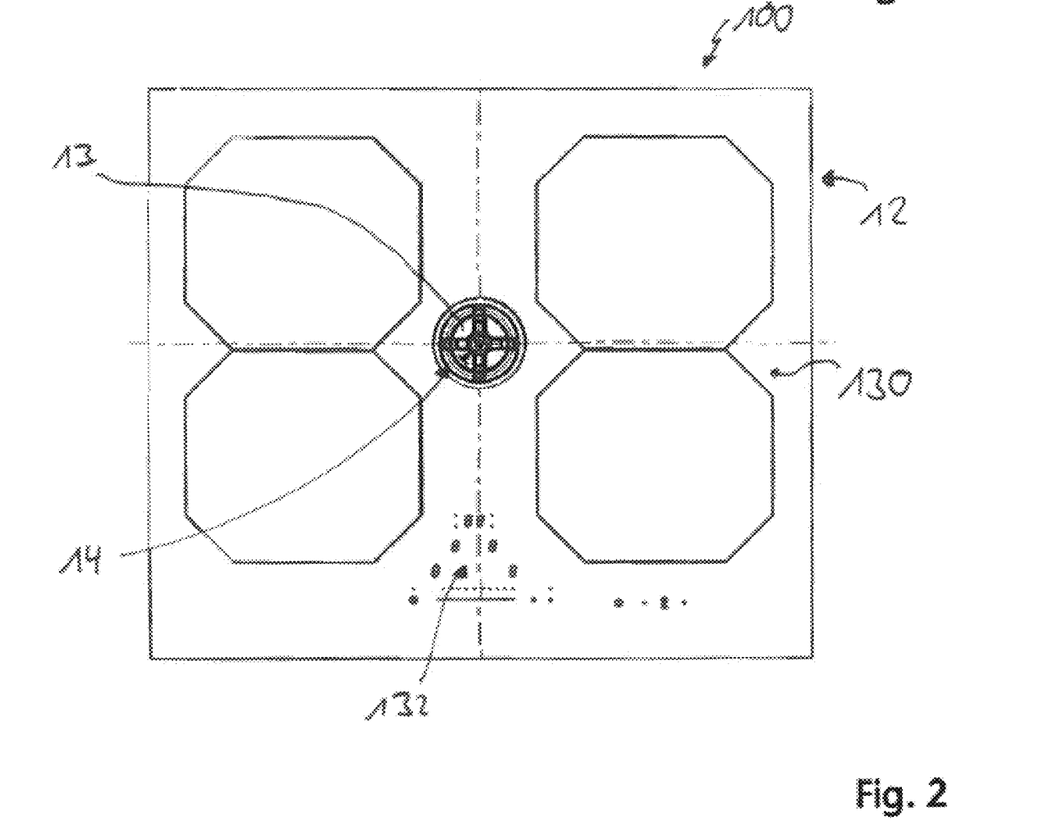
FIG. 2 schematically depicts a plan view of the hob assembly of FIG. 1 according to one or more embodiments shown and described herein.

FIG. 2 shows a top view of the hob assembly according to FIG. 1 with the cooking zone 12 and the cooking surface 130 that forms the top of the cooking zone 12. A through opening 13 in the form of a bore in the cooking zone 12, into which the connecting element 14 is inserted, is formed centrally between four hobs (not shown in more detail). The cooking zone 12 also has an operating segment 132 by means of which the individual hobs, which are not described in more detail, as well as the air-purifier device 10 can be controlled. Also shown is a grip element 110 of the connecting element 14 with four double webs with empty spaces between these and a central middle plate, by means of which the connecting element 14 can be removed from the air-purifier device 10 outside the cooking zone 12 along a central axis 11 in the upward direction, as shown in FIG. 4 for cleaning the air-purifier device 10.

Figure 3:
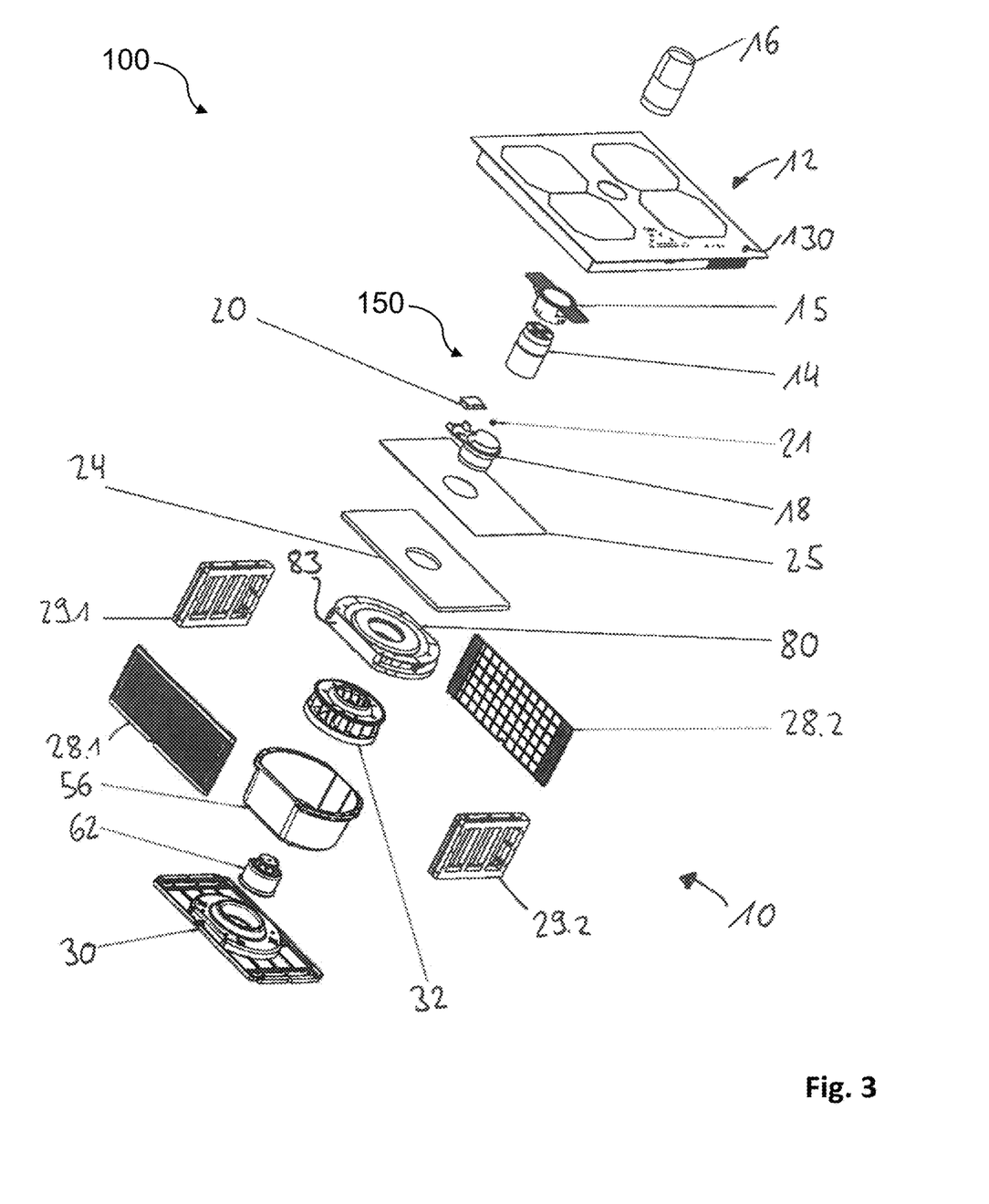
FIG. 3 schematically depicts an exploded view of the hob assembly of FIG. 1 according to one or more embodiments shown and described herein.

FIG. 3 shows an exploded drawing of the hob assembly 100 according to FIG. 1. In addition to FIG. 1, a connecting piece 15 can be seen, which can be arranged on the cooking zone 12 beneath the cooking surface 130 in the region of the through opening 13 of the cooking zone 12. This connecting piece interacts with the tubular connecting element 14. Furthermore, the switch 20 as well as a button 21 can be seen when the switch is designed as a mechanically acting switch, which can be arranged on a support receptacle (not shown here) of an adapter 18 for the connecting element 14. The button 21 can enter into an operative connection with the connecting element 14, or with an upper side of the housing 22 of the air-purifier device 10, which is formed by an alternatively existing cover plate 25 or a cover part 24, also in combination, as shown in FIG. 3. The connecting element 14, the connecting piece 15 and the adapter 18 are designed with a round cross section corresponding to the through opening 13 in the cooking zone 12 and a suction opening 26 (see FIG. 4) in the housing 22 of the air-purifier device 10. However, other cross sections can also be used, such as triangular, square or polygonal cross sections or even oval cross sections.

Figure 5:
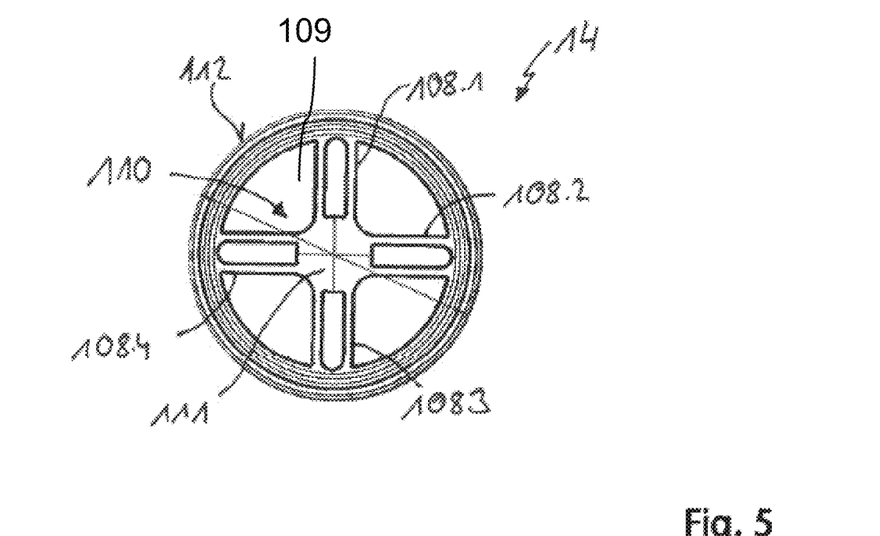
FIG. 5 schematically depicts a plan view of a connecting element according to according to one or more embodiments shown and described herein.
Figure 6:
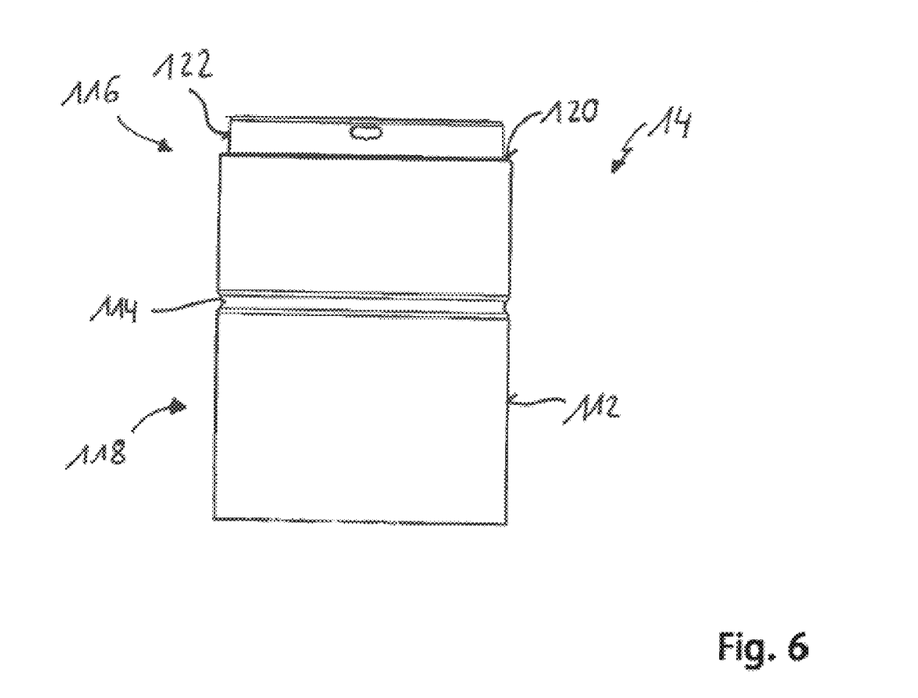
FIG. 6 schematically depicts a side view of the connecting element of FIG. 5 according to one or more embodiments shown and described herein.

As can be seen from FIG. 3, the housing 22 of the air-purifier device 10 is formed from the cover part 24, the longitudinal side parts 28.1 and 28.2, the transverse side parts 29.1 and 29.2 and a bottom part 30, which enclose an interior 23 of the housing 22. A motor 62 and a drip pan 56 are arranged on the bottom part 30. The motor 62 engages at least with a motor shaft, not described in any more detail here, through an opening in a bottom of the drip pan 56 and into a receiving recess 36, shown in FIGS. 4 to 6, of a fan wheel 32. A cover element 80, which is designed as a flow straightener and includes a straightener receiving element 83, is arranged above the fan wheel 32. The straightener receiving element 83 cooperates with an upper edge region of the drip pan 56 in such a way that, after the cover part 24 has been removed together with the cover plate 25, if applicable, a user can detach the cover element together with the drip pan 56 and the fan wheel 32 from the bottom part. For this purpose, at least one latching connection device 70, which is shown in FIGS. 5 and 6, is provided. This device exists between a motor shaft 64 (see FIG. 4) of the motor 62 and the receiving recess 36 of the fan wheel 32. In addition, latching connections or centering devices can also be formed between an underside of the drip pan 56 and an upper side of the bottom part 30. All connections between the air-purifier device 10, the adapter 18, the connecting element 14, the connecting piece 15 and the attachment element 16 are designed as plug-in connections and therefore make it possible for the air-purifier device 10 to be installed and dismantled easily. The attachment element can also have radial openings and, in the case of such a configuration, be designed to be closed at its upper end portion opposite the cooking zone 12. The connecting piece 15, the connecting element 14, and the adapter 18 with a switch 20 together form an embodiment of the connection assembly 150 according to the invention.

Figure 4:
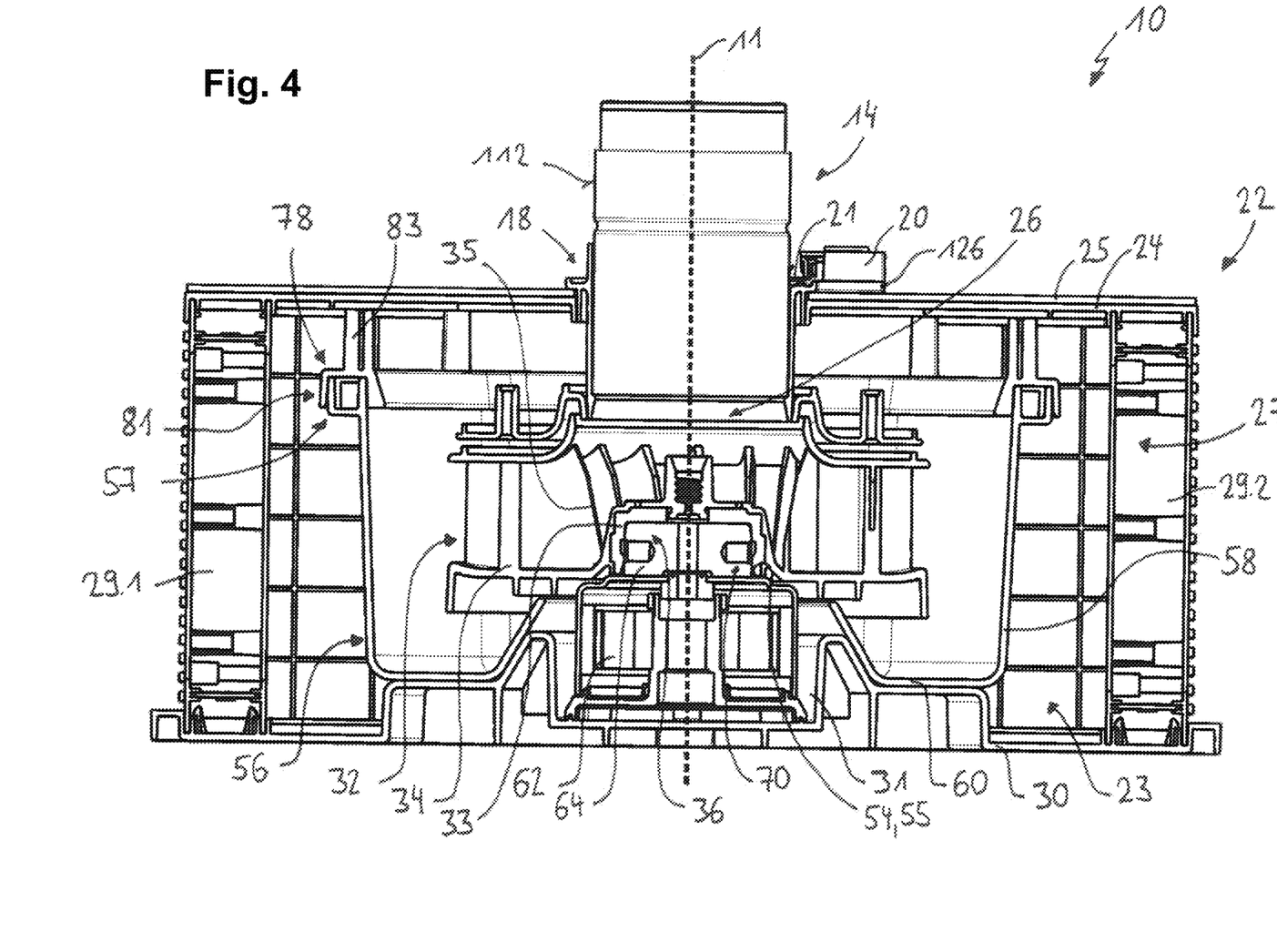
FIG. 4 schematically depicts a partial sectional view of an air-purifier device according to one or more embodiments shown and described herein.

FIG. 4 now shows the air-purifier device 10 with the connecting element 14 and the adapter 18 arranged thereon in a sectional view. The flow straightener 80 has been omitted for reasons of illustration, but the straightener receiving element 83 is still shown in FIG. 4. The bottom part 30 has a motor mount 31 on which or in which the motor 62 with the motor shaft 64 is accommodated. Electronics, which are not shown in more detail, with a control unit for the motor 62 are located outside of housing 10, in a control housing that is spatially separated from housing 10 of the air-purifier device. The motor shaft 64 protrudes into a receiving recess 36 in the fan wheel 32. A latching connection device 70 is formed between the receiving recess 36 of the fan wheel and the motor shaft 64. This device consists, for example, of a plurality of resiliently mounted balls, so-called pressure balls, which are arranged on the motor shaft 64. Two, three, four or more such pressure balls can be arranged there. These balls engage in grooves, not described in any more detail here, on an inner peripheral surface 38 of the receiving recess 36. The grooves are designed as a single circumferential annular groove. The annular groove has differently designed flanks, as shown in FIG. 6. The second flank of the groove, which is arranged closer to the motor 62, is designed radially or arcuately in shape.

The fan wheel 32 has an inner part 33 which is formed, for example, from cast aluminum. In addition, the fan wheel 32 has an outer part 34 which is formed from plastic. The drip pan 56 has a bottom 60 on which water and oil collect when the air-purifier device 10 is in operation, and a side wall 58 which also serves as a rebound wall for an air flow generated radially by the fan wheel 32. Ultimately, the radial air flow is diverted through the side wall 58, parallel to a central axis 11 of the air-purifier device 10, in the opposite direction of the air flowing in and sucked in via the suction opening 26 in the upper side of the housing 22, in order to then flow via the flow straightener 80 to an outer ring-shaped region of the housing 22 as a directed transport and to leave the housing 22 of the air-purifier device 10 via a housing outflow opening 27 provided by the transverse side parts 29.1 and 29.2. Supplementary filters, in the form of filter cassettes, can also be provided and inserted into receptacles in the transverse side parts 29.1 and 29.2, which are not described in further detail. These filter cassettes, not shown here, can contain activated carbon, for example, and are used to completely reduce odors, insofar as these have not already been eliminated by the air-purifier device 10 that does not use such filter cassettes. The fan wheel 32 has a plurality of air blades 35 which radially deflect the air drawn in axially through the suction opening 26 in the form of cooking vapors, in the direction of the side wall 58 of the drip pan 56. The suction opening accommodates the adapter 18 and thus also the connecting element 14.

The drip pan 56 has an upper edge portion 57 which works together with an outer edge portion 81 of the straightener receptacle element 83 and forms a grip element 78 for a user so that the cover part 24 and the cover plate 25, which is also provided as an alternative here, have been removed, the drip pan 26 together with the fan wheel 32 and the flow straightener 80 with the straightener receiving element 83 can be removed from the housing 22 of the air-purifier device 10.

In the embodiment of the air-purifier device 10 according to FIG. 4 together with the connecting element 14 and the adapter 18 for the connecting element 14, the interaction of the switch 20 with an outer surface 112 of the connecting element 14 via a button 21 of the switch 20 can be seen. If the air-purifier device 10, which is arranged in a pull-out drawer beneath a cooking zone 12 in kitchen furniture, is to be cleaned, the connecting element 14 is first removed upwards through the through opening 13 shown in FIGS. 1 and 2 by the grip element 110 there. In the process, the button 21 of the switch 20 loses contact with the outer surface 112 of the connecting element 14 and switches off the air-purifier device 10. Alternatively, it can also be provided that, for example, the button 21 interacts with an upper side of the housing 22, for example the alternative cover plate 25 provided here, or only a cover part 24, in which case the switch 20 is not on the upper side of the housing 22 of the air-purifier device 10 or else is arranged on the adapter 18, as shown in FIG. 4, but rather on the cooking zone 12, for example on the connecting piece 15 according to FIG. 3. In the embodiment shown in FIG. 4, the switch 20 is arranged on a support 126 of the adapter 18. This support 126 can be designed as a lateral extension of a flange of the adapter 18. The fan wheel 32 can then be removed together with the drip pan 56 and the cover element 80 designed as a flow straightener. The insertion of the fan wheel 32 and its arrangement on the motor shaft 64 is facilitated by a bevel 55 formed on an opening edge region 54 of the receiving recess 36. The positioning of the drip pan 56 can be facilitated by unspecified positioning means on the bottom part 30.

The connecting element 14 is slidably mounted in the adapter 18 via its outer surface 112, so that a height compensation can thereby be performed. Depending on the installation situation and dimensions of the kitchen furniture, which are usually designed as built-in cupboards, in which the hob assembly 100 or air-purifier device 10 according to the invention is arranged, the distance between the cooking surface 130 of the cooking zone 12 and an upper side of the housing 22 of the air-purifier device 10 is different. For example, a height compensation of approximately 40 mm can be performed by means of the connecting element 14, which is approximately defined in a region between the flange of the adapter 18 and a lower edge of the connecting element 14 facing the fan wheel 32. The connecting element 14 itself is held firmly but mechanically removable on the cooking zone 12 of the hob assembly 100, for example by a latching connection which is provided by the adapter 15 in cooperation with the connecting element 14. In contrast, the connecting element 14 is slidably arranged in the adapter 18. The connecting element 14 or the adapter 15 can provide a receptacle for the attachment element 16 in their end region facing the cooking zone 12. This attachment element can thus be easily removed by the user so that pots and other cookware can be easily moved on the cooking surface 130. The attachment element 16 serves to suck out air, in the form of cooking vapors, at the level of pots and near the opening edge of the pots. For this purpose, attachment elements 16 of different heights can be made available to the user. The connecting element 14 closes with its upper end region flush with the cooking surface 130 of the cooking zone 12 in order not to hinder a movement of cookware. To remove the connecting element 14, it has a centrally arranged grip element 110 according to FIG. 2. This grip element 110 can also be designed in such a way that it prevents particles, dirt or cooking residues from falling into the air-purifier device 10, which is why it can also be designed, for example, in the form of a net. Furthermore, the grip element can also serve as an advertising medium and reduce the suction noise when the hob assembly 100 or the air-purifier device 10 is in operation, which can be done by specifically designing the edges and arranging webs in the grip element 110 of the connecting element 14.

FIG. 5 shows that the grip element 110 of the connecting element 14 has four double webs 108.1, 108.2, 108.3 and 108.4, which intersect in the middle plate 111 in front of an inlet opening 109. The double webs 108.1, 108.2, 108.3 and 108.4 are arranged at right angles to one another. The middle plate 111 can serve as an advertising surface. To pull out the connecting element 14, the user inserts fingers between the double webs 108.1, 108.2, 108.3 and 108.4 and grips the middle plate 111. Then, the user pulls the connecting element 14 upwards. The connecting element 14 is designed in the shape of a round tube and has a radial circumferential surface or outer surface 112.

FIG. 6 shows that the connecting element 14 includes a radially circumferential groove 114 which is formed on the outer surface 112. The groove 114 is designed to receive latching projections 19.1, 19.2, 19.3 and 19.4 of the connecting piece 15 shown in FIG. 7. The groove 114 divides the connecting element 14 into a first end portion 116 and a second end portion 118. In the first end portion 116 in the region of the inlet opening 109, the outer surface has a recess, which forms an axial stop 120 and a radial contact surface 122 for the attachment element 16 shown in FIG. 1 and FIG. 3. The connecting element has an outlet opening (not shown) which is opposite the inlet opening 109 shown in FIG. 5. The inlet opening 109 and the outlet opening are arranged on the front side on the connecting element.

Figure 7:
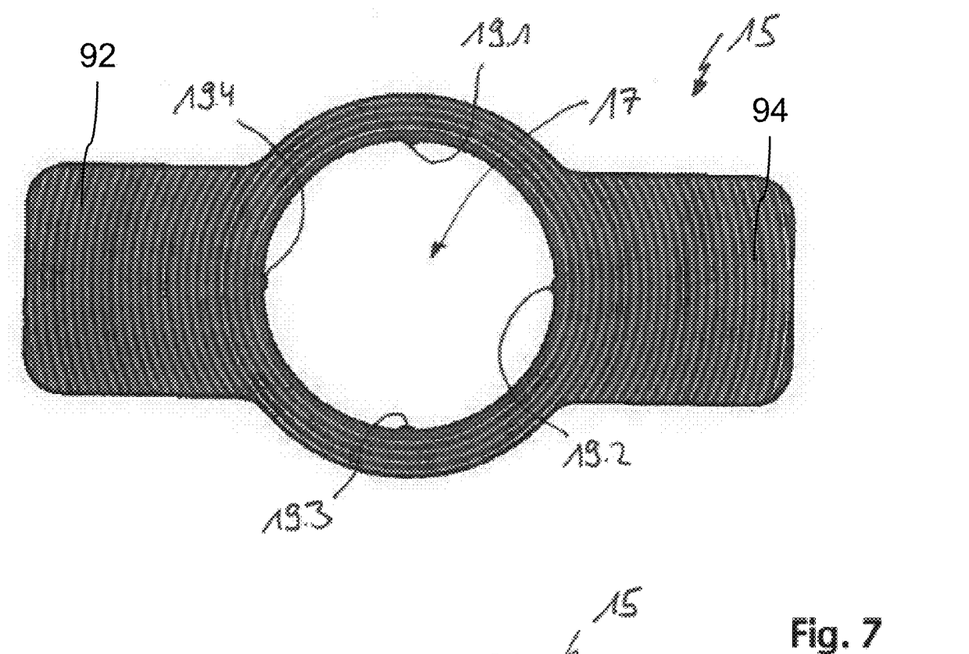
FIG. 7 schematically depicts a plan view of a connecting piece according to one or more embodiments shown and described herein.

FIG. 7 shows that the connecting piece 15 has a receiving opening 17 for the connecting element 14. The inner diameter of the receiving opening 17 and the outer diameter of the outer surface 112 are formed substantially the same. The connecting element 14 can be arranged in the receiving opening 15. For dismantling, the connecting element 14 can be pulled completely out of the connecting piece 15. When inserted in an insertion direction, the four latching projections 19.1, 19.2, 19.3 and 19.4, which are arranged in the receiving opening 17, latch in the groove 114 of the connecting element 14. This way, the connecting element 14 is arranged on the cooking zone 12 in a mechanically removable manner. In the installation position shown in FIG. 1, the connecting piece 15 is attached to the underside of a surface of the cooking zone 12 so that the through opening 13 of the cooking zone and the receiving opening 17 of the connecting piece 15 are congruent. For dismantling, the connecting element 14 can also be pulled completely out of the through opening 13. On its top, the connecting piece 15 includes a ribbed flange 90 with a first wing 92 and a second wing 94 for attachment to the cooking zone 12.

Figure 8:
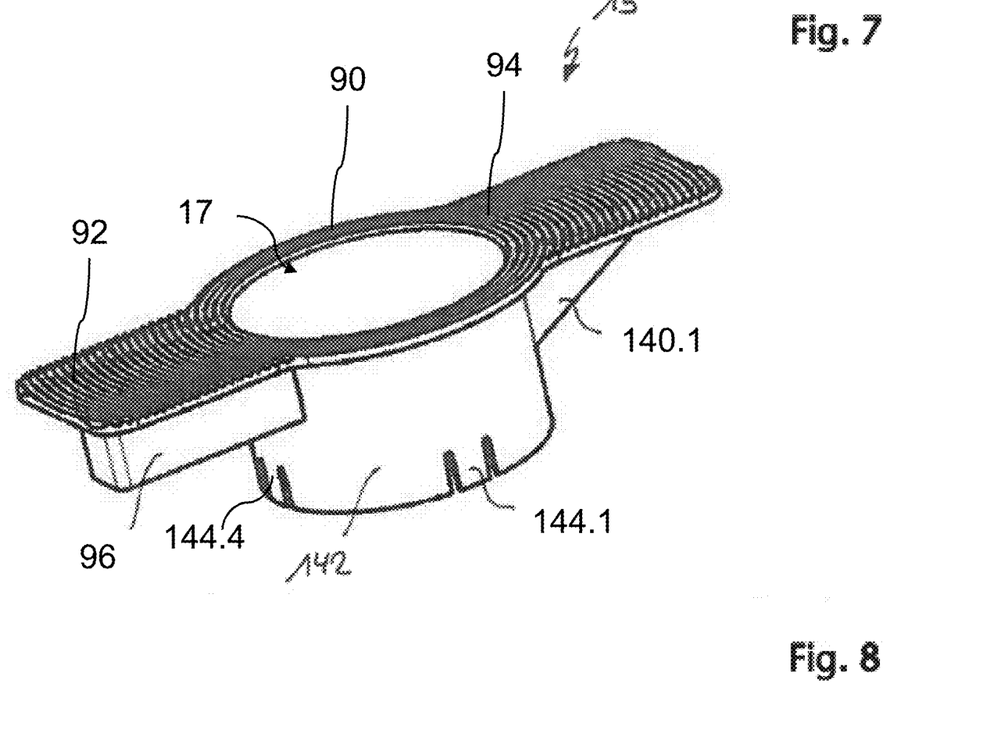
FIG. 8 schematically depicts a perspective view of the connecting piece of FIG. 7 according to one or more embodiments shown and described herein.

FIG. 8 shows a support 96 for a switch 20 on the underside of the first wing 92 and a reinforcement rib 140.1 on the underside of the second wing 94. The connecting piece 15 has a tubular connecting part 142 which extends downward away from the flange 90 and encloses the receiving opening 17. The connecting part 142 has notch portions 144. The connecting piece component 142 is elastic in the notch regions 144. The latching projections 19.1, 19.2, 19.3 and 19.4 are formed on the inside of the notch regions 144.

Figure 9:
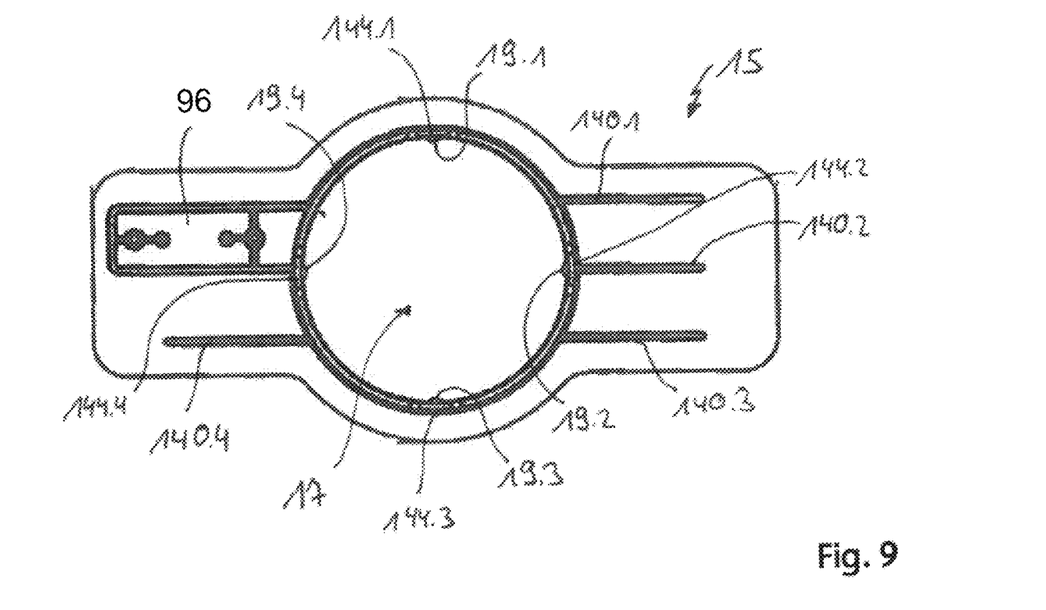
FIG. 9 schematically depicts a bottom view of the connecting piece of FIG. 7 according to one or more embodiments shown and described herein.

FIG. 9 shows that a reinforcement rib 140.4 is also formed on the underside of the first wing 92. In addition to the reinforcement rib 140.3, the reinforcement ribs 140.2 and 140.1 are also formed on the underside of the second wing 94. FIG. 9 also shows that the connecting piece 15 has four notch regions 144.1, 144.2, 144.3 and 144.4, each with a latching projection 19.1, 19.2, 19.3 and 19.4.

Figure 10:
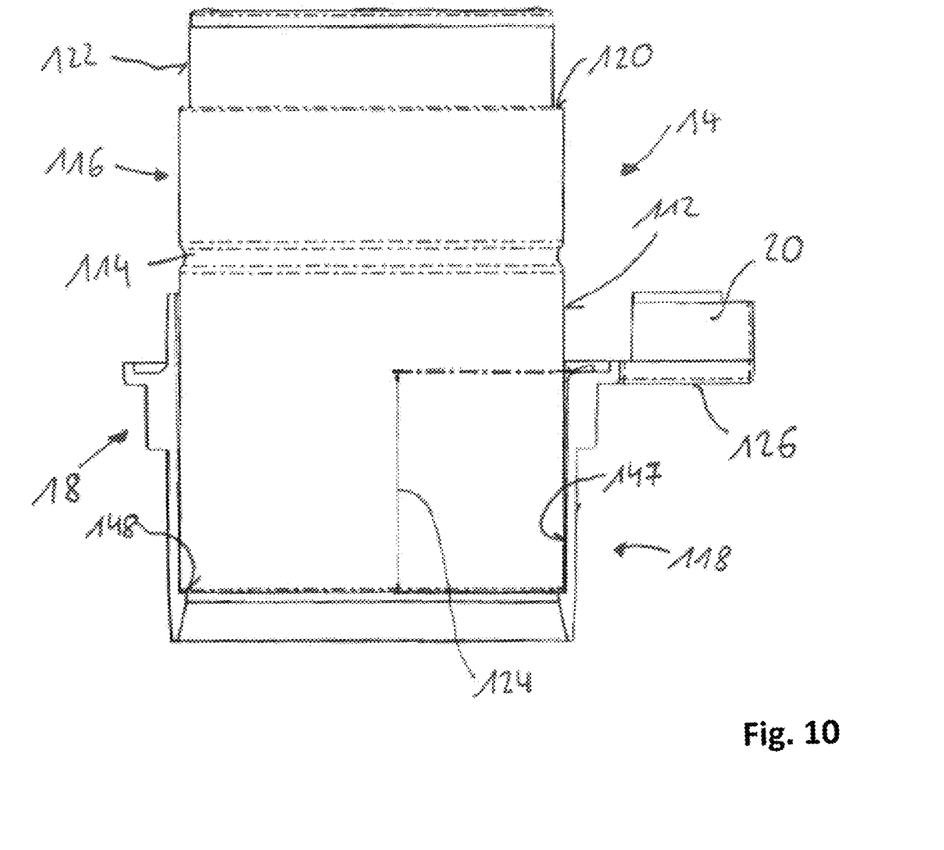
FIG. 10 schematically depicts a side view of an arrangement of a connecting element according to FIG. 5 in a first embodiment of an adapter according to one or more embodiments shown and described herein.

In FIG. 10, the above-described connecting element 14 is slidingly arranged with a displacement height 124 illustrated by the double arrow in the adapter 18 shown in FIG. 3 and FIG. 4. To make the connecting element easy to insert, the adapter 18 has an inner contact wall 147 that tapers conically. In the installed position, the end portion 118 is arranged on a stop of the adapter 18 designed as a radially circumferential projection 148. The amount of displacement 124 is determined by a longitudinal extension of the inner contact wall 147. On the top of the adapter 18, a support 126 is formed on which a switch 20 is arranged. The support 126 is formed on the radial outside of the adapter 18.

Figure 11:
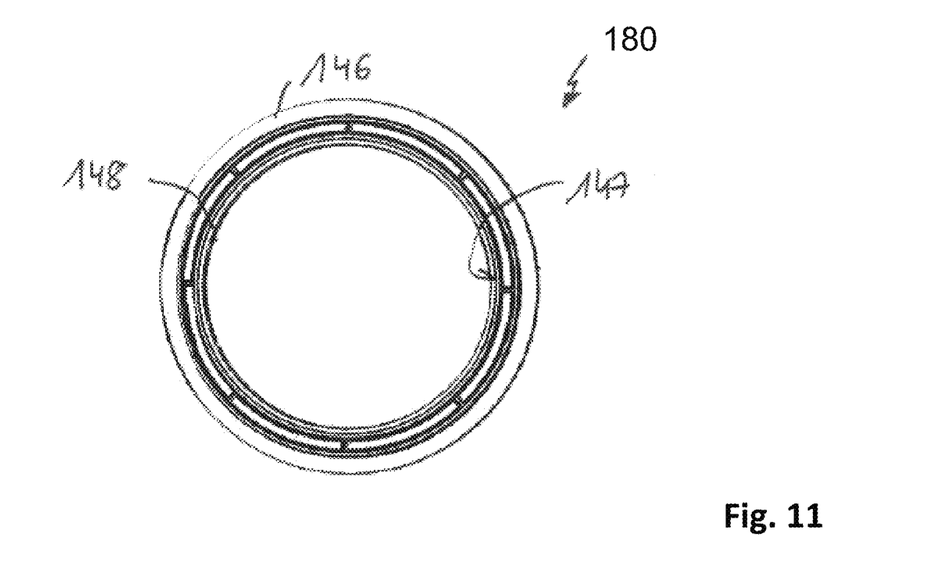
FIG. 11 schematically depicts a plan view of an alternative embodiment of an adapter according to one or more embodiments shown and described herein.
Figure 12:
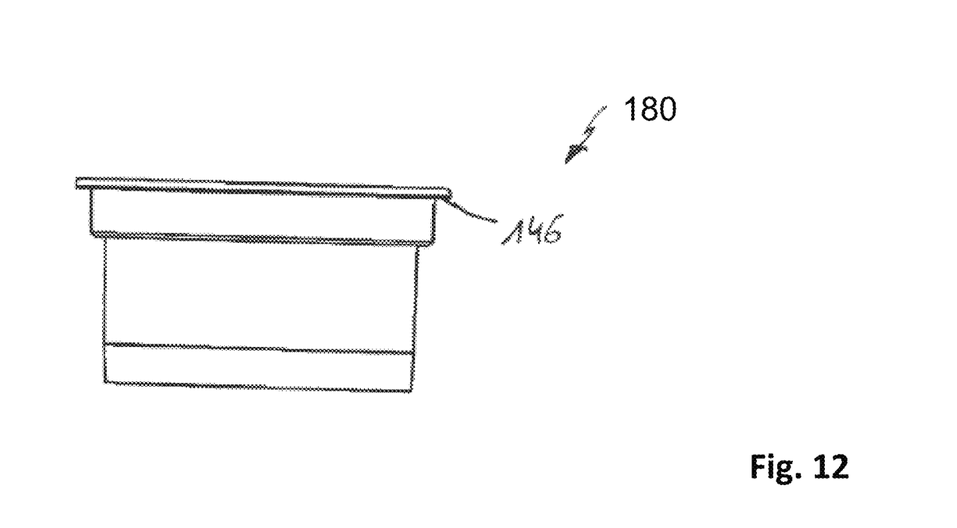
FIG. 12 schematically depicts a side view of the adapter of FIG. 11 according to one or more embodiments shown and described herein.

FIG. 11 and FIG. 12 show that a second embodiment of the adapter 180 differs from the adapter 18 in that it does not have a support 126 for a switch. In contrast, the adapter 180 has a simple flange 146. However, the adapter 180 also has an inner contact wall 147, which tapers conically, and a stop designed as a radially circumferential projection 148.

Figure 13:
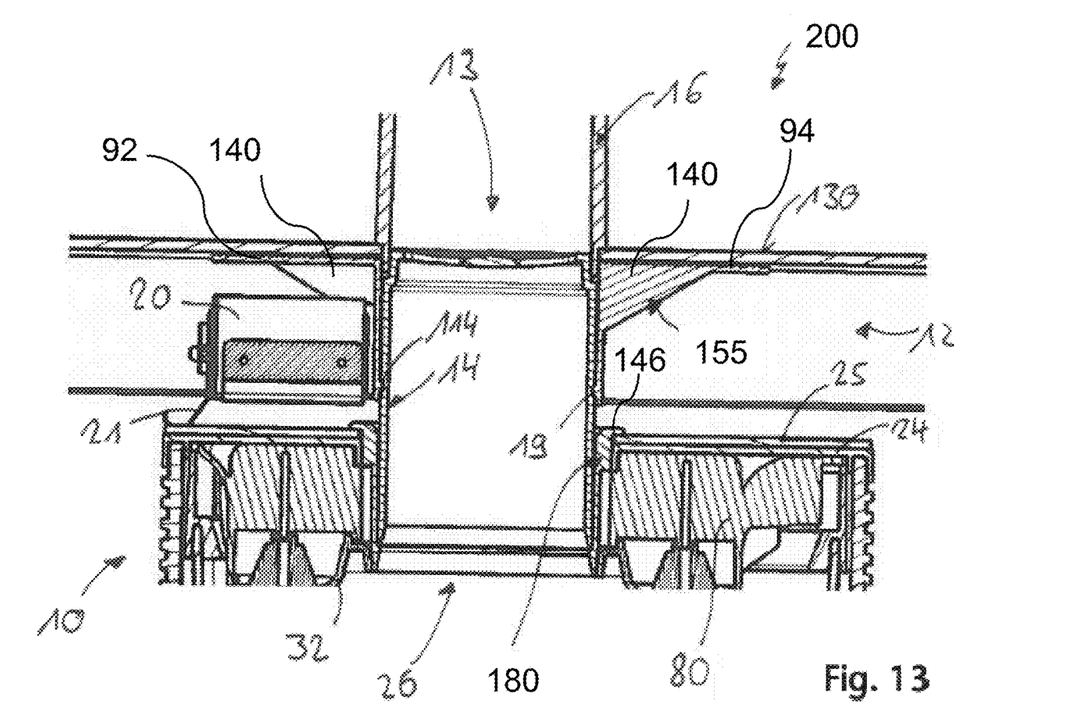
FIG. 13 schematically depicts a portion of an alternative embodiment of the hob assembly according to one or more embodiments shown and described herein.

FIG. 13 shows that an alternative embodiment of the hob assembly 200 differs from the first embodiment of the hob assembly 10 in that the adapter 180 is used instead of the adapter 18. The assembly of the switch 20 is also different. This switch has a button 21, which is in operative connection with the cover plate 25 of the air-purifier device 10. When the air-purifier device 10 is removed, the power supply to the hob assembly 200 is interrupted. The hob assembly 200 also has a modified connecting piece 155 instead of the connecting piece 15. The connecting piece 155 does not have a support for the switch 20. Only reinforcement ribs 140 are formed on the underside of the wings 92, 94. Otherwise, the connecting piece 155 is the same as the connecting piece 15.

FIG. 13 also shows that the adapter 180 is arranged in the suction opening 26 of the air-purifier device 10. The air-purifier device 10 is designed as described above and has a fan wheel 32 and a cover element 80. The flange 146 of the adapter 180 rests on the cover plate 25 of the cover part 22. The connecting piece 155 is attached to the underside of the cooking zone 12. The connecting element 14 is arranged in the through opening 13 of the cooking zone 12 and the suction opening 26. The connecting element 14 is fastened to the cooking zone 12 by means of the connecting piece 155 in a mechanically removable manner, as described for the hob assembly 100. The latching projections 19 of the connecting piece 155 engage in the groove 114 of the connecting element 14 shown in FIG. 10. By means of the adapter 180, the connecting element 14 is height-adjustably arranged in the air-purifier device 10. The air-purifier device 10 is arranged beneath the cooking surface 130 of the cooking zone 12. An attachment element 16 is arranged on the connecting element 14.

The present disclosure provides an improved hob assembly which can be installed and removed particularly easily. In particular for cleaning purposes, the connecting element and/or the air-purifier device of the hob assembly can be dismantled quickly and easily.

The invention claimed is:

1. A hob assembly comprising:
   at least one cooking zone;
   at least one air-purifier device arranged underneath the at least one cooking zone; and
   at least one connecting element for connecting the at least one cooking zone to the at least one air-purifier device such that an air is conducted from the at least one cooking zone to the at least one air-purifier device via the at least one connecting element,
   wherein:
      the at least one connecting element has a first end portion, which is a front end portion in an insertion direction of the at least one connecting element, and a second end portion, which is at a rear in the insertion direction of the at least one connecting element and which is height-adjustably mounted in the air-purifier device, wherein an upper end face of which is assigned to the first end portion and adjoins a surface of the at least one cooking zone, is arranged in at least one through opening of the at least one cooking zone in a mechanically removable manner,
      the at least one connecting element being arranged on the at least one cooking zone in a mechanically removable manner and height-adjustably mounted in the at least one air-purifier device, and
      the at least one cooking zone includes at least one connecting piece as a fastening type, which is arranged beneath the surface of the at least one cooking zone, the at least one connecting element is arranged in the at least one connecting piece in a mechanically removable manner.

2. The hob assembly according to claim 1, further comprising:
   at least one switch which is in operative connection with the at least one connecting element and/or the air-purifier device.

3. The hob assembly according to claim 2, wherein the at least one switch further comprises:
   at least one button, said button touching an outer surface of the at least one connecting element and/or an outer surface of the at least one air-purifier device.

4. The hob assembly according to claim 1, wherein the at least one connecting piece further includes at least one latching projection.

5. The hob assembly according to claim 1, wherein the at least one air-purifier device includes at least one adapter with the at least one connecting element being height-adjustably mounted in the adapter.

6. The hob assembly according to claim 5, wherein the adapter is designed in the shape of a sleeve and that the at least one connecting element is at least partially received in the adapter.

7. The hob assembly according to claim 1, wherein
   the at least one connecting element is arranged in the at least one through opening in a mechanically removable manner.

8. The hob assembly according to claim 7, wherein the at least one connecting element is passed completely through the through opening.

9. The hob assembly according to claim 8, wherein the at least one connecting element further includes at least one grip element for pulling the at least one connecting element out of the at least one air-purifier device.

10. The hob assembly according to claim 8, wherein the at least one connecting element further includes at least one groove for a mechanically removable arrangement on the at least one cooking zone.

11. The hob assembly according to claim 8, wherein the at least one connecting element is tubular and includes the first end portion arranged on the at least one cooking zone or in the at least one through opening in a mechanically removable manner, and the second end portion that is height-adjustably mounted in the at least one air-purifier device.

* * * * *